(No Model.)
F. M. TOWL.
GAS METER.
No. 377,967.     Patented Feb. 14, 1888.
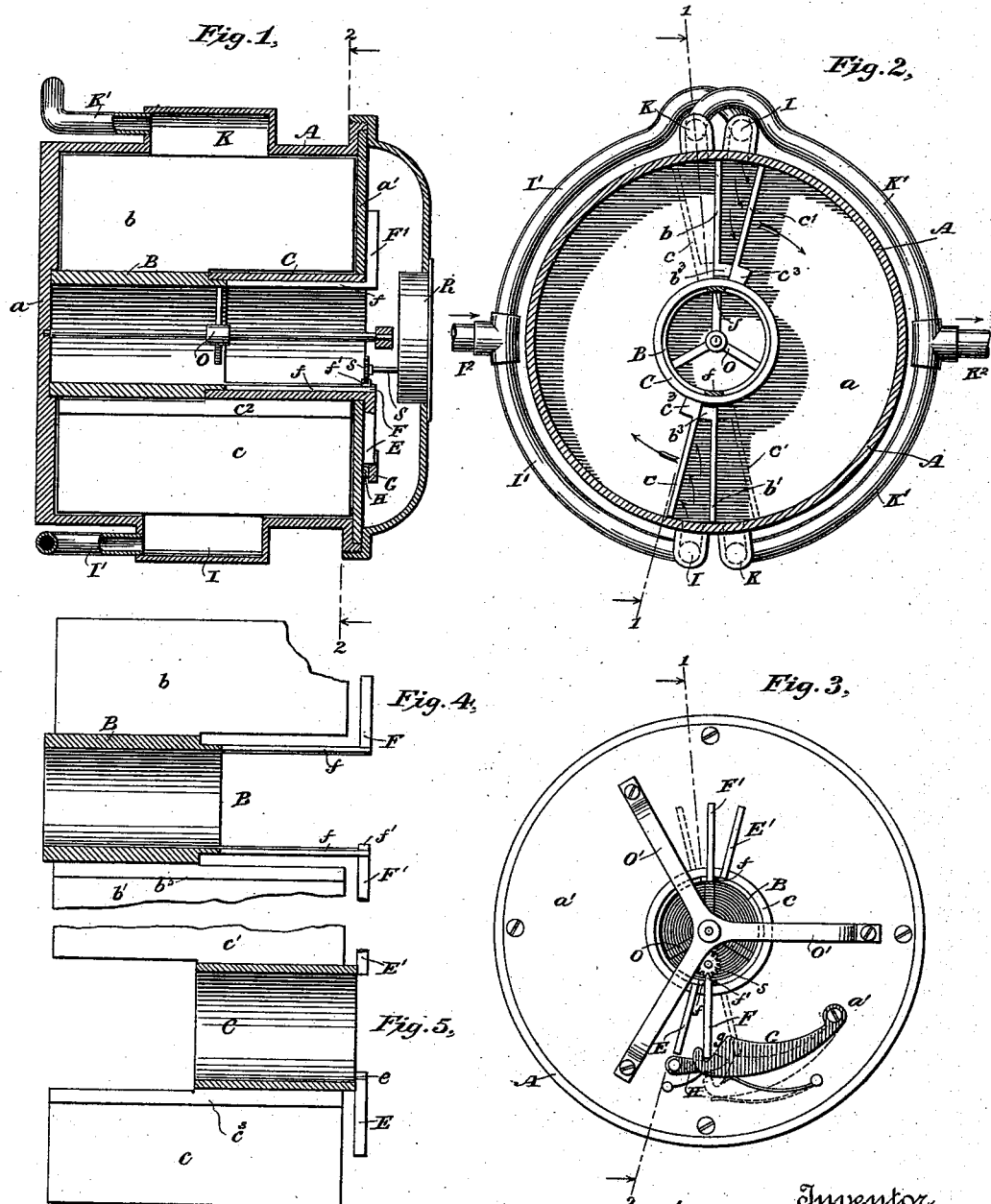
Witnesses
Geo. W. Breck
Edward Thorpe
Inventor
Forrest M. Towl.
By his Attorneys
Baldwin & Davidson

UNITED STATES PATENT OFFICE.

FORREST M. TOWL, OF BROOKLYN, NEW YORK.

GAS-METER.

SPECIFICATION forming part of Letters Patent No. 377,967, dated February 14, 1888.

Application filed September 24, 1887. Serial No. 250,607. (No model.)

*To all whom it may concern:*

Be it known that I, FORREST M. TOWL, of Brooklyn, in the county of Kings and State of New York, have invented certain new and useful Improvements in Meters, of which the following is a specification.

In the accompanying drawings, Figure 1 is a longitudinal section on the line 1 1 of Fig. 2 and 1 2 of Fig. 3; Fig. 2, a vertical transverse section on the line 2 2 of Fig. 1; Fig. 3, an end view with the cap of the meter removed; and Figs. 4 and 5 are detail views of the two cylinders, a tooth for operating the register being shown on each cylinder.

The casing A is circular in cross section, and is preferably cylindrical. Arranged centrally within it in the same axial line are two rotating bodies or cylinders, B C, preferably hollow, the adjoining ends of which have their bearings on each other, and their opposite ends respectively in the end wall, $a$, of the casing and in the partition $a'$. A bearing spider or wheel, O, carried on a spindle supported at one end in the casing and at the other in a spider-frame, O', mounted on the outer face of the partition $a'$, may be arranged within the cylinders to support them at their adjoining ends.

At one or more points on each cylinder (two opposite each other are shown) are secured wings or plates $b\ b'$ and $c\ c'$, which accurately fit the annular chamber between the cylinders and casing. In Fig. 1 are seen one of the wings $b$, connected with the cylinder B, and one, $c$, connected with the cylinder C. These wings are also clearly shown in Fig. 2. On one side of each wing, near its cylinder, is a projection or shoulder, $c^3$ or $b^3$, of any suitable shape or character, for a purpose presently described. On the end of the cylinder C and on the outer side of the partition $a'$ are two radially-projecting arms, E E', occupying positions corresponding with the wings $c\ c'$. The inner cylinder, B, has arms F F', similarly located, carried by arms $f f$ extending from the cylinder B through the bore of cylinder C, as shown in Fig. 5. The arms E E' and F F' operate in connection with pivoted catches or locking devices G H, mounted on the partition $a'$, as presently described.

Two ports, preferably elongated, are formed in each side of the casing at two opposite points, as shown, those marked I being inlets and those marked K outlets. The two inlet-ports are connected by pipes I' with a common supply-pipe, I², while the other ports, K, are connected by pipes K' with the pipe K².

Assuming that the parts are in the position shown in Figs. 2 and 3, the inner cylinder, B, will be locked by the engagement of the arm F with the catches or locking devices G and H, and the wings $b\ b'$ stand between the inlet and outlet ports, as shown. They therefore form an abutment for the gas or water entering by the ports I, which, acting on the wings $c\ c'$, drive them around into the position indicated by the dotted lines in Fig. 2. When they reach that position, the arm E', acting on the curved edge of the catch G, has raised it, as indicated by the dotted lines, Fig. 3. A slight further advance of the wings and arm E' will carry the arm past the corner of the catch, which then is pressed by its spring upon the arm, its inclined edge $g$ pushing the arm forward, causing it to snub up the catch H and advance to the position just vacated by the arm F, that arm having been advanced by the shoulder $c^3$ on the wing $c'$, which shoulder came in contact with the wing $b'$ at the time the wing $c'$ moved into the position shown by dotted lines in Fig. 2. The arm E" will now be locked by the catches G H, and the gas or water will act on the wings $b\ b'$. In this way the intermittent action of the two cylinders is automatically continued.

I prefer to have two wings on each cylinder, as they counterbalance each other and permit an easy rotation.

The registering mechanism R, which may be of any ordinary character, may be actuated by the rotation of either cylinder, or by both, in any suitable way. From Figs. 1 and 3 it will be seen that the spindle S of one of the registering-wheels projects inwardly and carries upon its end a toothed wheel, $s$, which stands in suitable proximity to the arms $f$, projecting out from the cylinder B. One or both of these arms (one being shown in Figs. 1 and 3) is provided with a tooth, $f'$, which strikes a tooth of the wheel S at each revolution, and through it actuates the registering mechanism. If desired, the cylinder C may also act on the register, and for that purpose it may be provided with an inwardly-projecting tooth, e, Fig. 5, which also acts on the wheel S. This way of actuating the register may, however, be changed and the register acted upon in any suitable manner.

The particular manner of locking the arms E E' and F F' may be changed, and any suitable locking mechanism be employed.

By locating the locking mechanism within the casing I effectually protect it from injury, prevent its parts or bearings from becoming fouled by dust and dirt, reduce the liability of leakage, and obtain a meter presenting a symmetrical exterior easy to handle. So, also, the location of the registering mechanism and its operating devices within the casing presents similar advantages.

Obviously, the gas or water which leaks from the annular chamber into the cylinders and end compartment will not impair the working of the meter, but on the contrary will serve to equalize pressures and facilitate accurate action.

The different bearings and the edges of the wings may of course be packed, in any usual way, to adapt them specially to the fluid to be measured.

I claim as my invention—

1. The combination, substantially as set forth, of a casing, the intermittently-actuated cylinders arranged therein, wings on opposite sides of each cylinder, inlet and outlet ports elongated in a direction parallel with the outer edges of the wings, arranged side by side in the opposite sides of the casing, and locking mechanism by which the cylinders are alternately locked with the wings between the ports, for the purpose described.

2. The combination of the casing, the hollow cylinders arranged end to end and having their bearings on each other, the wings carried by the cylinders, the ports, the partition, the locking mechanism mounted on the partition, and the locking-arms carried by the cylinders.

3. The combination of the casing having inlet and outlet ports on opposite sides thereof, the cylinders arranged therein, the wings on the opposite sides of each cylinder, and the locking mechanism arranged within the casing.

4. The combination of the casing having ports therein, the cylinders, their wings, the locking-arms, and locking devices arranged within the casing, which lock the wings between the ports and automatically act on the arms to move the wings respectively past the outlet and inlet ports, for the purpose described.

5. The combination, with the casing having suitable ports, the cylinders, wings, and locking-arms, of spring-acting locking devices having a pivoted spring-catch, G, with an inclined face, g, for acting on the locking-arms, substantially as set forth.

6. The combination of the casing having suitable ports, the hollow cylinders and wings thereon, the partition in which the open end of one of the hollow cylinders has its bearing, the locking-arms, and the locking mechanism and registering mechanism arranged in the compartment between the partition and the cap or cover of the meter.

7. The combination of the casing having suitable ports, the cylinders, the wings thereon, the locking-arms, and the reversely-arranged pivoted spring-acting catches G H.

8. The combination, substantially as set forth, of a casing, the intermittently-actuated cylinders arranged therein, wings carried by the cylinders, inlet and outlet ports in the casing, and locking mechanism arranged within the casing, by means of which the cylinders are alternately locked with the wings between the ports, for the purposes described.

9. The combination of the casing having suitable ports therein, the intermittently-actuated cylinders with wings, the locking mechanism within the casing, the registering mechanism, also located within the casing, and the intermittently-operating connecting mechanism between one of the rotating cylinders and the registering mechanism, whereby the latter is periodically operated, substantially as and for the purpose set forth.

In testimony whereof I have hereunto subscribed my name.

FORREST M. TOWL.

Witnesses:
GEO. F. HARRIMAN,
EDWARD C. DAVIDSON.